Dec. 17, 1946.     H. J. HEPP     2,412,936
PRODUCTION OF CYCLOPENTENE
Filed June 13, 1944
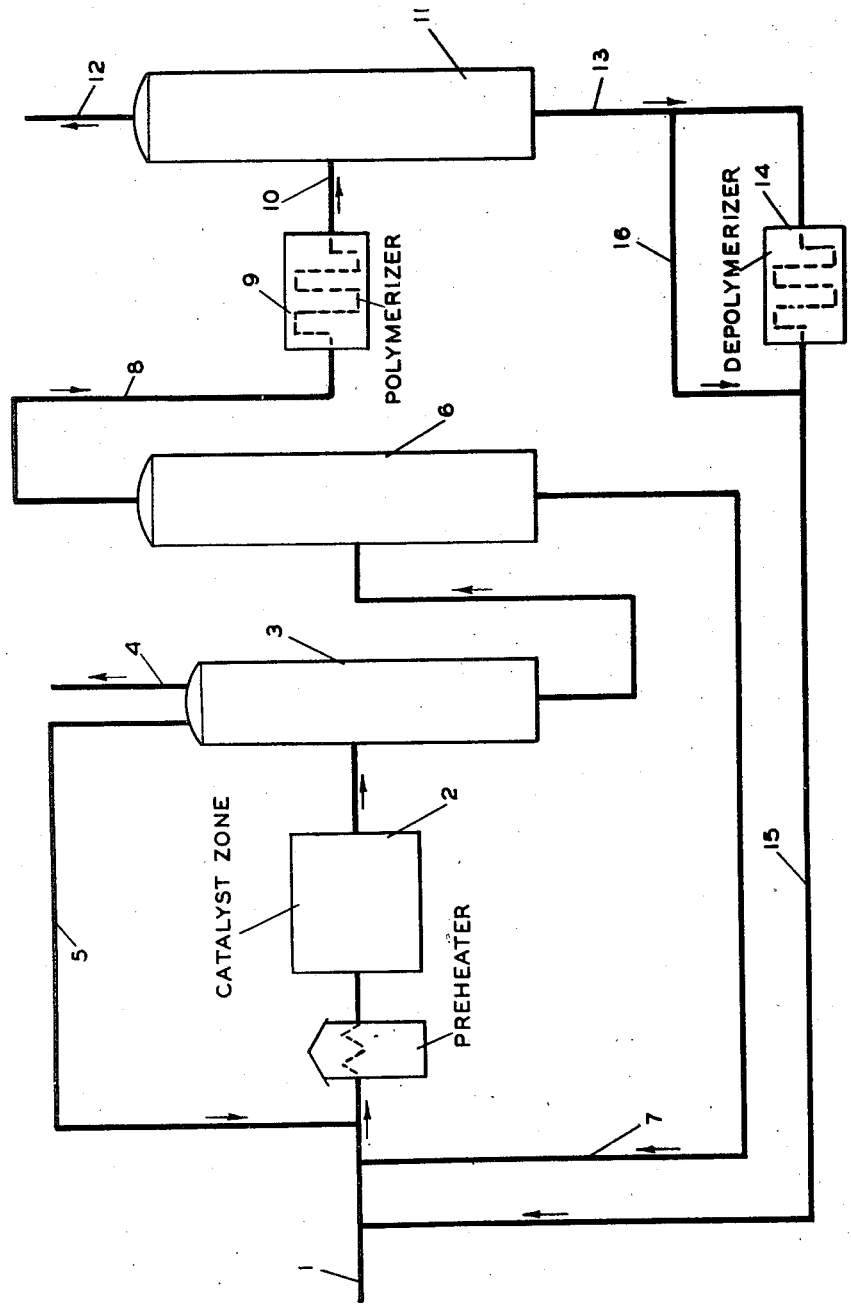
INVENTOR
H. J. HEPP
BY *Hudson and Young*
ATTORNEYS Patented Dec. 17, 1946

2,412,936

UNITED STATES PATENT OFFICE 2,412,936

PRODUCTION OF CYCLOPENTENE

Harold J. Hepp, Bartlesville, Okla., assignor to Phillips Petroleum Company, a corporation of Delaware Application June 13, 1944, Serial No. 540,070

6 Claims. (Cl. 260—666)

This invention relates to a process for the production of cyclopentene by catalytic dehydrogenation of cyclopentane in the presence of hydrogen. In one of its more specific aspects, the invention relates to a process in which cyclopentane together with hydrogen is catalytically dehydrogenated in the vapor phase to produce cyclopentene.

Cyclopentene is useful as an intermediate material for the synthesis of a wide variety of organic chemicals, such as cyclopentanol and cyclopentanone, which are useful as industrial solvents, and which may be converted to other valuable compounds. Cyclopentane, but not cyclopentene, occurs naturally in many petroleum fractions.

It has been found that cyclopentane may be readily dehydrogenated catalytically to cyclopentadiene. Such processes are described, for example, in the following U. S. patents: Grosse, No. 2,157,202; Grosse and Mavity, No. 2,157,203; and Morrell, No. 2,157,939. I have found that cyclopentane may be readily dehydrogenated in the presence of a number of dehydrogenation catalysts, such as chromic oxide-alumina and magnesia-alumina, to produce cyclopentadiene. However, the unsaturated hydrocarbon product of such processes generally comprises a mixture of cyclopentadiene and cyclopentene in at least a 1 to 1 ratio. (Cf. Frey, Industrial and Engineering Chemistry, 1934, vol. 26, page 198.) Attempts to conduct the dehydrogenation of cyclopentane to yield cyclopentene without the production of substantial amounts of cyclopentadiene have heretofore not been successful.

A catalytic process for the production of cyclopentene from cyclopentane by first dehydrogenating cyclopentane to cyclopentadiene, then hydrogenating the cyclopentadiene to cyclopentene, is disclosed in the copending application of Gardner C. Ray, Serial No. 493,688, filed July 6, 1943. This method, while satisfactory in many respects, has the disadvantage that two separate stages, operated under different reaction conditions, are required.

It is an object of the present invention to provide a process for the production of cyclopentene from cyclopentane by dehydrogenation in which the yield of cyclopentene is greater than has heretofore been obtained.

It is a further object of the invention to provide a one-stage process for the production of cyclopentene by the catalytic dehydrogenation of cyclopentane without the formation of large proportions of cyclopentadiene, that is, by catalytic dehydrogenation in which the production of cyclopentadiene is suppressed.

Other objects and advantages of the invention, some of which are referred to hereinafter, will be obvious to those skilled in the art to which the invention pertains.

I have discovered that cyclopentane may be catalytically dehydrogenated in a single step or stage to produce greatly increased yields of cyclopentene when the dehydrogenation is carried out in the presence of hydrogen. While the hydrogen that is added to the cyclopentane that is charged suppresses somewhat the extent of dehydrogenation of the cyclopentane, the yield of cyclopentene from the cyclopentane that is dehydrogenated is greatly increased. In addition to this favorable effect on cyclopentene production, the presence of hydrogen greatly reduces the amount of carbonaceous deposit formed on the catalyst. Loss of valuable products is also substantially reduced and catalyst regeneration is greatly facilitated.

The dehydrogenation process of my invention is practiced by passing cyclopentane mixed with hydrogen, which may be fresh added hydrogen or recycle hydrogen containing cyclopentadiene, in vapor phase at a total pressure within the range of approximately 1 to approximately 10 atmospheres over an active dehydrogenation catalyst at a dehydrogenation temperature and a suitable space velocity to produce the desired extent of conversion. The conversion should be between approximately 20 and approximately 50 per cent, preferably about 30 per cent, per pass. Conversion temperatures in the dehydrogenation range of approximately 1000° to approximately 1300° F., depending upon the catalyst and the other prevailing reaction conditions, are contemplated. In general, the more active the catalyst, the lower the required conversion temperature. It is desirable to employ a highly active dehydrogenation catalyst in order to avoid cracking and other undesirable side reactions.

Hydrogen should be added or be present in the cyclopentane charge stock in such quantity that the feed to the catalyst bed comprises not more than approximately 90, and not less than approximately 10 mol per cent of cyclopentane, and preferably not more than 80 nor less than 25 mol per cent, respectively. When such conditions are maintained, a greatly increased yield of cyclopentene is obtained in the dehydrogenation and the proportion of cyclopentadiene in the resulting product is substantially lower than that obtained without the presence of hydrogen. The effect of the hydrogen appears to be more than a simple mass-action effect of hydrogen in suppressing the conversion of cyclopentane to cyclopentadiene since greater proportions of cyclopentene are produced than can be accounted for on the basis of the hydrogen that is added. The hydrogen that is added to the cyclopentane charge in the practice of my invention is preferably that produced in the dehydrogenation process itself.

The effluent mixture from the catalyst bed is separated by suitable conventional means, as by condensation and fractionation, into hydrogen, cyclopentadiene, cyclopentene and cyclopentane fractions. The unchanged cyclopentane, along with part or, preferably, all of the cyclopentadiene and part but not all of the hydrogen, is recycled with fresh charge to the catalyst.

A very convenient means of facilitating the separation of cyclopentadiene and cyclopentene, the boiling points of which differ by only a few degrees, is first to dimerize the cyclopentadiene to dicyclopentadiene, the boiling point of which is much higher than that of any of the other materials involved in the process. A preferred method of operation according to this modification of the invention comprises flashing the hydrogen from the cooled effluent mixture leaving the catalyst in a flash tank, then separating the remaining hydrocarbon mixture by fractionation into light and heavy fractions, the former comprising chiefly cyclopentene and cyclopentadiene and the latter comprising chiefly unconverted cyclopentane. The light fraction is then passed to a dimerizing zone wherein the cyclopentadiene is polymerized to dicyclopentadiene by maintaining suitable conditions of temperature, pressure, and contact time. Suitable temperatures are within the range of 200° to 350° F. at superatmospheric pressures and a time of contact within the range of approximately ½ to approximately 15 hours. The mixture is then passed to a second fractionation means for the separation of the cyclopentene from the dicyclopentadiene. The cyclopentene overhead fraction is removed as a product of the process and the dicyclopentadiene may, together with the unconverted cyclopentane and part of the hydrogen, be recycled to the catalyst bed. In some cases it may be desirable to subject the dicyclopentadiene to heating at a temperature within the range of approximately 350° to approximately 450° F. and preferably at atmospheric, subatmospheric or a low superatmospheric pressure, for a sufficient period of time to effect depolymerization, before recycling it to the catalyst.

In another method of operation, wherein the cyclopentadiene is not recycled to the catalyst with the unconverted cyclopentene and hydrogen, a further yield of cyclopentene may be produced by half-hydrogenating the cyclopentadiene in accordance with the method disclosed in the copending application of Gardner C. Ray referred to hereinabove.

In the accompanying drawing, which is a diagrammatic flow sheet of a preferred embodiment of the process of the invention, fresh cyclopentane in the vapor state, together and in admixture with vaporized recycle cyclopentane, cyclopentadiene and hydrogen, preheated to a suitable temperature, is conducted through charge conduit or line 1 into reaction zone 2. The mixture is contacted in the reaction zone with a suitable active conventional dehydrogenation catalyst under such conditions of temperature and pressure and period of contact that about 20 to 50 per cent of the cyclopentane entering is dehydrogenated. The effluent mixture is then cooled to about 200° F. or lower, and passes into flash tank 3 under a pressure of about 25 pounds per square inch or higher. From flash tank 3 a portion of the hydrogen is removed from the system through conduit 4, and the remainder of the hydrogen is recycled through conduit 5 to the charge conduit 1 of the reaction zone 2. The amount of hydrogen which is removed is approximately that formed in the dehydrogenation reaction or that amount which it is necessary to remove from the cycle at this point to maintain the hydrogen content of the charge to the catalytic reaction zone constant. The hydrogen removed through conduit 4 is preferably passed to a recovery means, not shown, where any cyclic hydrocarbons containing five carbons in the ring are recovered, as by liquid extraction or by other suitable means, and are subsequently returned to the process. Dicyclopentadiene from the process may be employed as a liquid for absorbing such cyclic hydrocarbons, if desired.

The liquid kettle product from flash tank 3, comprising principally cyclopentene, cyclopentadiene and unconverted cyclopentane, is passed to fractionator 6 wherein it is separated into a light overhead fraction and a heavier kettle product. The kettle product, comprising chiefly unreacted cyclopentane and some dicyclopentadiene, is recycled through conduit 7 to the reaction zone.

The overhead product from fractionator 6, comprising chiefly cyclopentene and cyclopentadiene, is conducted through conduit 8 to dimerizing zone 9 in which the cyclopentadiene is polymerized to dicyclopentadiene. The polymerization is effected thermally, merely by maintaining the material at a temperature within the range of approximately 200° to approximately 350° F. at a superatmospheric pressure for a period of approximately ½ to 15 hours or longer. From dimerizing zone 9, the mixture is passed through conduit 10 into fractionator 11, wherein it is separated into a cyclopentene fraction that is discharged through conduit 12 and a dicyclopentadiene fraction, which is the kettle product. The cyclopentene fraction is removed as a product of the process. The dicyclopentadiene fraction is passed through conduit 13 into depolymerization zone 14. In this zone the dicyclopentadiene is thermally depolymerized at a temperature within the range of approximately 350° to approximately 450° F. and a low pressure, preferably about atmospheric or subatmospheric, to cyclopentadiene. The cyclopentadiene is then recycled from zone 14 through conduit 15 to the inlet to reaction zone 2. Alternatively, the dimer may be recycled directly to the dehydrogenation step through conduits 16 and 15.

*Example*

Cyclopentane vapor together with added hydrogen was passed under controlled conditions of pressure, temperature and flow rate through a bed of ⅛ inch pellets of a chromic oxide-alumina catalyst disposed in a catalyst tube. The catalyst tube was a vertically supported, 22-inch length of quartz tubing having an internal diameter of 17 mm. that was provided with a coaxial internal quartz thermocouple well. The top and bottom sections of the tube were packed with 6 to 14-mesh quartz chips; the central section, approximately 3.75 inches in length, was packed with the chromic oxide-alumina catalyst. The catalyst tube was heated in an 18-inch electric tube furnace. The cyclopentane vapors passed downwardly through the tube.

At the beginning of the run, the catalyst was heated to the operating temperature in a stream of nitrogen and was then flushed with hydrogen. During the run the total effluent mixture was collected for analysis. At the end of the run, the catalyst was revivified by a stream of air. The water and carbon dioxide formed were weighed and were used for computing the amount of hydrocarbon material deposited on the catalyst.

For comparison, a run was also made under substantially identical conditions in which no hydrogen was charged with the cyclopentane vapors.

The operating conditions that were maintained and the results obtained were as follows:

|  | Without hydrogen | With hydrogen |
|---|---|---|
| Hydrogen added, gas vol. percent | None | 73 |
| Pressure, atmospheres | 1 | 1 |
| Average temperature, °F | 1,048 | 963 |
| Cycle length, min | 30 | 30 |
| No. of cycles | 1 | 1 |
| Space velocity (vol./vol. cat./hr.) | 468 | 630 |
| Effluent analysis, percent by weight: |  |  |
| Hydrogen | 1.9 | 0.3 |
| Light gases ($C_1$-$C_5$) | 1.4 | 4.8 |
| Cyclopentene | 8.3 | 11.9 |
| Cyclopentadiene | 8.3 | 9.1 |
| Cyclopentane | 70.4 | 71.6 |
| Deposit on catalyst | 9.7 | 2.3 |
|  | 100.0 | 100.0 |
| Cyclopentane conversion, percent | 29.6 | 28.4 |
| Weight ratio, cyclopentene/cyclopentadiene | 1.0 | 1.31 |

From the above results it will be noted that less material is deposited on the catalyst when hydrogen is charged with the cyclopentane and that, although the conversion of cyclopentane is somewhat smaller, the amount of cyclopentene formed is greater and the formation of cyclopentadiene is suppressed.

Although a chromium oxide catalyst is specified in the above example, it is to be understood that the invention is not limited thereto. Chromium oxide catalysts in general are preferred catalysts but other conventional dehydrogenation catalysts, particularly highly active catalysts, may be used. Such alternative dehydrogenation catalysts include bauxite, alumina and other metal oxides, alone or supported on catalyst carriers, and with or without promoters. The conversion temperature which it will be desirable to maintain will be dependent upon the nature of the catalyst but will, in general, be within the range of approximately 1000° to approximately 1300° F.

Inasmuch as the foregoing description comprises preferred embodiments of the invention it is to be understood that the invention is not limited thereto and that modifications and variations may be made therein without departing substantially from the invention, the scope of which is to be limited only by the appended claims.

I claim:

1. A process for the production of cyclopentene by the catalytic dehydrogenation of cyclopentane which comprises passing a mixture of cyclopentane and hydrogen containing at least approximately 25 and less than approximately 80 mol per cent of cyclopentane into contact with a dehydrogenation catalyst at a temperature within the range of approximately 1000° to approximately 1300° F. for a sufficient contact period to convert at least 20 per cent of the cyclopentane to unsaturated cyclic hydrocarbons containing a five-carbon-atom ring, the major portion of which is cyclopentene.

2. A process for the production of cyclopentene by the catalytic dehydrogenation of cyclopentane which comprises passing a mixture of cyclopentane and hydrogen containing at least approximately 25 and less than approximately 80 mol per cent cyclopentane into contact with a chromium oxide dehydrogenation catalyst at a temperature within the range of approximately 1000° to approximately 1300° F. for a sufficient contact period to convert at least 20 per cent of the cyclopentane to unsaturated cyclic hydrocarbons containing a five-carbon-atom ring, the major portion of which is cyclopentene.

3. A process for the production of cyclopentene by the catalytic dehydrogenation of cyclopentane which comprises passing a mixture of cyclopentane and hydrogen containing at least approximately 25 and less than approximately 80 mol per cent cyclopentane into contact with a dehydrogenation catalyst at a temperature within the range of approximately 1000° to approximately 1300° F. for a sufficient contact period to convert at least 20 per cent of the cyclopentane to unsaturated cyclic hydrocarbons containing a five-carbon-atom ring comprising cyclopentene, cyclopentadiene, and dicyclopentadiene, the major portion of which is cyclopentene, removing hydrogen in an amount equivalent approximately to that formed in the dehydrogenation, separating cyclopentene from the resulting products, and recycling the unconverted cyclopentane, cyclopentadiene and any dicyclopentadiene and the remaining hydrogen together with additional fresh cyclopentane to the dehydrogenation catalyst.

4. A process as defined in claim 3 and further characterized in that the cyclopentene is separated from the cyclopentadiene in the product by subjecting the product to thermal treatment to dimerize the cyclopentadiene contained therein without substantial polymerization of the cyclopentene and thereafter separating the cyclopentene from the dicyclopentadiene by fractional distillation.

5. A process as defined in claim 3 and further characterized in that the cyclopentene is separated from the cyclopentadiene in the product by subjecting the product to thermal treatment to dimerize the cyclopentadiene contained therein without substantial polymerization of the cyclopentene, thereafter separating cyclopentene from the dicyclopentadiene by fractional distillation, thermally depolymerizing the separated dicyclopentadiene, and recycling the recovered cyclopentadiene together with the recovered unconverted cyclopentane and hydrogen together with additional fresh cyclopentane to the dehydrogenation catalyst.

6. A process for the production of cyclopentene by the catalytic dehydrogenation of cyclopentane which comprises passing a mixture of cyclopentane and hydrogen containing at least approximately 25 and less than approximately 80 mol per cent cyclopentane into contact with a dehydrogenation catalyst at conversion conditions of temperature and pressure for a sufficient contact period to convert at least 20 per cent of the cyclopentane to unsaturated cyclic hydrocarbons containing a five-carbon-atom ring, the major portion of which is cyclopentene.

HAROLD J. HEPP.